(12) United States Patent
Bruner et al.

(10) Patent No.: US 7,243,134 B2
(45) Date of Patent: Jul. 10, 2007

(54) SERVER-BASED NAVIGATION SYSTEM HAVING DYNAMIC TRANSMITTAL OF ROUTE INFORMATION

(75) Inventors: John D. Bruner, South Barrington, IL (US); Richard Mark Clayton, Phoenix, AZ (US); James Blake Bullock, Gilbert, AZ (US)

(73) Assignee: Motorola, inc., Schaumburg, IL (US)

( * ) Notice: Subject to any disclaimer, the term of this patent is extended or adjusted under 35 U.S.C. 154(b) by 461 days.

(21) Appl. No.: 10/179,076

(22) Filed: Jun. 25, 2002

(65) Prior Publication Data

US 2003/0236818 A1 Dec. 25, 2003

(51) Int. Cl.
  G06F 15/167 (2006.01)
  G01C 21/00 (2006.01)
(52) U.S. Cl. .............. 709/216; 709/213; 701/208; 701/209; 701/200; 701/202; 701/25
(58) Field of Classification Search ............... 709/217; 701/202, 201
  See application file for complete search history.

(56) References Cited

U.S. PATENT DOCUMENTS

| | | | |
|---|---|---|---|
| 5,488,359 A * | 1/1996 | Faris et al. ............... 340/7.52 |
| 6,052,738 A | 4/2000 | Muller et al. |
| 6,073,076 A | 6/2000 | Crowley et al. |
| 6,209,026 B1 * | 3/2001 | Ran et al. .................. 709/218 |
| 6,278,383 B1 * | 8/2001 | Endo et al. ............ 340/995.14 |
| 6,292,743 B1 * | 9/2001 | Pu et al. ..................... 701/202 |
| 6,420,960 B1 * | 7/2002 | Dorenbosch et al. ...... 340/7.52 |
| 6,421,602 B1 * | 7/2002 | Bullock et al. ............. 701/201 |
| 6,429,812 B1 * | 8/2002 | Hoffberg .................. 342/357.1 |
| 6,438,488 B2 * | 8/2002 | Lee ............................ 701/208 |
| 6,484,093 B1 | 11/2002 | Ito et al. |
| 6,507,783 B2 * | 1/2003 | Katayama et al. .......... 701/208 |
| 6,567,848 B1 * | 5/2003 | Kusuda et al. ............. 709/219 |
| 6,581,003 B1 | 6/2003 | Childs et al. |
| 6,584,402 B2 | 6/2003 | Fukushima et al. |
| 6,973,318 B2 * | 12/2005 | Jambhekar et al. ...... 455/456.1 |

* cited by examiner

*Primary Examiner*—Syed A. Zia
(74) *Attorney, Agent, or Firm*—Thomas V. Miller; Brian M. Mancini; Terri S. Hughes

(57) ABSTRACT

A navigation system having a client device and a service center. The client device is capable of transmitting a starting point and a destination point from a user. The client device also includes a memory having a memory limit. The service center is capable of receiving the starting point and the destination point and calculates a route between the starting point and the destination point. The service center further is capable of generating and transmitting data associated with the calculated route to the client device. However, before transmitting the data, the service center makes a determination whether the size of the data associated with the calculated route is greater than the memory limit of the memory in the client device. If so, the data associated with the calculated route is transmitted to the client device in a plurality of segmented data files, each at a different time. The division of data may take a variety of forms including a division by geographic area. There is also a means for thinning data in geographic or coverage areas having limited connectivity. Additionally, there is a method in the service center to transmit information in segmented data files when the data associated with the calculated route is greater than the memory limit of the memory in the client device.

25 Claims, 10 Drawing Sheets

SERVER-BASED NAVIGATION SYSTEM HAVING DYNAMIC TRANSMITTAL OF ROUTE INFORMATION

FIELD OF THE INVENTION

This invention in general relates to a server-based navigation system and method of handling the transmittal of route information to a client device and, more particularly, to a system and method that uses dynamic transmittal of route information to memory limited and connection limited client devices.

BACKGROUND OF THE INVENTION

Devices that provide navigation guidance to a driver in a vehicle are well known. In conventional systems, a navigation unit is installed in the vehicle. The navigation unit typically has an interactive visual screen or buttons that allow a driver to enter a desired destination location. The navigation unit has memory or a CD drive that keeps map data and a processor that generates a route based on the map data and desired destination. Conventional navigation units having map data and map generation processors are expensive. They also require a user to update the map data and do not permit the unit to select a route based on other considerations such as current traffic patterns or delays.

There has been increasing interest in server-based navigation systems. A server-based navigation system typically downloads information to a navigation unit or client device by wireless communications. The downloaded information contains the topology or other attribute information much like the original map information. The downloaded information can become quite large and may conflict with the memory size or connection limits of the client device. Different types of client devices (by different manufacturers) contain varying memory sizes. The wireless connection service used by a client device may also have varying coverage or bandwidth constraints. A portion of, or all of, the route information may be lost if the data file containing the route information is larger than the available memory size of the client device. Additionally, a part or all of the route information may be lost if the transmittal of the information occurs within an area having limited coverage or bandwidth.

Accordingly, there is a need to provide server-based navigation systems that can handle different types of client devices. Additionally, there is a need to handle situations where a calculated route passes through an area having limited coverage or bandwidth. It is, therefore, desirable to provide an improved server-based navigation system and method to overcome or minimize most, if not all, of the preceding problems.

Figure 1:
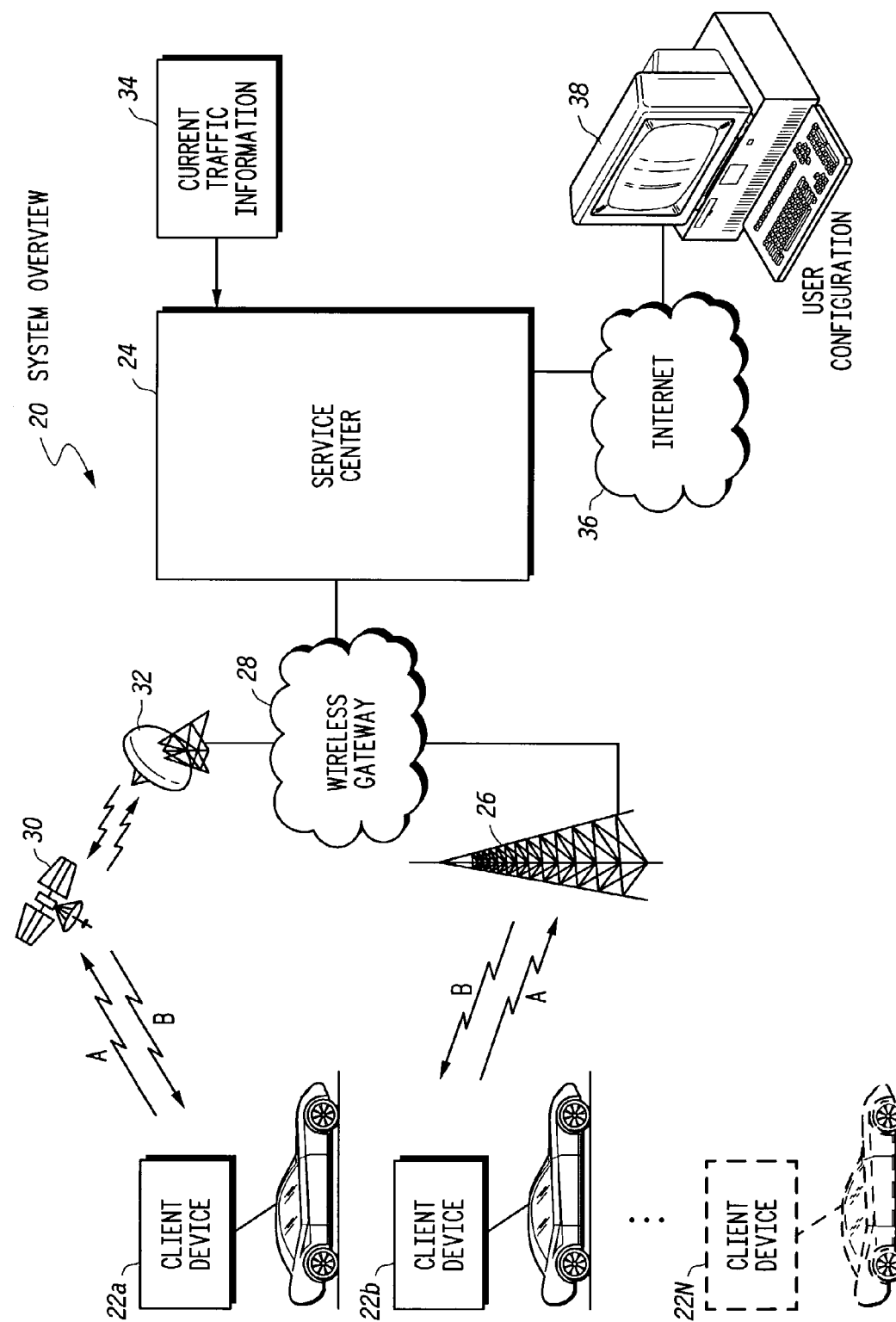
FIG. 1 is a top-level block diagram of one embodiment of a navigation system of the present invention having a service center and a plurality of client devices.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is server-based navigation system and method of handling the transmittal of route information to a client device. The system and method reduces the complexity of the client device and is adaptable to a variety of different devices.

To this end, in one embodiment there is a navigation system having a client device and a service center. The client device is capable of transmitting a starting point and a destination point from a user. The client device also includes memory having a memory limit. The service center is capable of receiving the starting point and the destination point and calculates a route between the starting point and the destination point. The service center further is capable of generating and transmitting data associated with the calculated route to the client device. However, before transmitting the data, the service center makes a determination whether the size of the data associated with the calculated route is greater than the memory limit of the memory in the client device. If so, the data associated with the calculated route is transmitted to the client device in a plurality of segmented data files, each at a different time.

The generated data associated with the calculated route may include a variety of forms including information to provide voice, text, or graphic instructions to the user of the client device. In one embodiment, the plurality of segmented data files each represent a separate geographic region along the calculated route. In other embodiments, the type of data determines how the segmented data files are divided. The data may also be divided up to thin out data for a particular geographic or coverage area. This may be necessary for a number of reasons including limited coverage or bandwidth within an area, increased data transmission costs within an area, or government regulations limiting certain types of navigation notification means.

In another embodiment, there is a method in a service center of a navigation system. The method includes the steps of: receiving a starting point and a destination point from a client device; calculating a route based on at least the starting point and the destination point; generating data associated with the calculated route; determining the size of the generated data associated with the calculated route; comparing the size of the generated data associated with the calculated route with a memory limit of the client device; dividing the generated data associated with the calculated route into a plurality of segmented data files if the size of the generated data associated with the calculated route is greater than the memory limit of the client device; and transmitting each segmented data file to the client device at a different time.

The method may further include a step of monitoring a current location of the client device along the calculated route before the step of transmitting each segmented data file to the client device. The method may also include a step of reducing the size of the data associated with the calculated route over a geographic region that has a connection limitation for the client device.

In a further embodiment, there is a method in a navigation system where the system includes a service center and a client device. The method includes the steps of: sending a starting point and a destination point to the service center; calculating in the service center a route for the client device based at least in part on the starting point and the destination point; generating in the service center data associated with the calculated route; determining in the service center whether a size of the generated data associated with the calculated route is greater than a memory limit of a memory in the client device; if the size of the generated data associated with the calculated route is greater than the memory limit of the memory in the client device, dividing in the service center the generated data associated with the calculated route into a plurality of segmented data files; and transmitting from the service center to the client device each segmented data file at a different time.

There is also a service center in a navigation system that has a communication unit and a server. The communication unit is configured to receive a starting point and a destination point for a client device within the navigation system. The server is connected to the communication unit and is configured to calculate a route between the starting point and the destination point. The server being further capable of generating and transmitting data associated with the calculated route to the client device. The data associated with the calculated route is transmitted to the client device in a plurality of segmented data files, each at a different time, if the server determines that all the data associated with the calculated route cannot be transmitted to the client device at a single time.

Navigation System 20

Now, turning to the drawings, FIG. 1 illustrates a top-level block diagram of a navigation system 20 for the present invention. Generally, the navigation system 20 includes a plurality of client devices 22a–22N and a service center 24. The components of the client devices 22a–22N and service center 24 are described further below in relation to FIGS. 2–4.

Referring initially to FIG. 1, in the navigation system 20, the client devices 22a–22N and the service center 24 may communicate with each other via wireless communications.

The wireless communications are illustrated in FIG. 1 by communication arrows A and B. The communications between the client devices 22a–22N and the service center 24 will now be described generally although a more detailed description is provided after the general discussion.

Generally, in one embodiment, a client device 22a–22N transmits its current location (or starting point) and desired location (or destination point) to the service center 24 via communication A. As shown in FIG. 1, in one embodiment, the communication A is a cellular wireless communication that is transmitted to a base station antenna 26, through a wireless gateway 28, and to the service center 24. The wireless gateway 28 may include a variety of systems depending on the implementation such as a cellular network and public switched telephone network (PSTN). For other types of wireless communications (such as satellite), the communication A may be transmitted to an earth orbiting satellite 30, through a satellite base station 32 and wireless gateway 28, and to the service center 24.

The transmission of the destination point to the service center 24 may be a voice call to an operator (live or recorded) at the service center 24 that is initiated by the user of the client device 22a–22N. The starting point may be computed by the client device 22a–22N using a Global Positioning System (GPS) receiver or other position determining method and transmitted during the voice call or a separate data transmission. The starting point may also be determined by network-based position computing methods such as Time Difference of Arrival (TDOA) or Enhanced Observed Time Difference (E-OTD). Alternatively, the transmission of the starting point and/or destination point to the service center 24 may be a data transmission of points manually entered by the user of the client device 22a–22N.

Those of ordinary skill in the art, having the benefit of this disclosure, will appreciate that many possible wireless communication methods may be used for communications from a client device 22a–22N to the service center 24. In one embodiment, the communications are via a cellular wireless communication such as AMPS, CDMA, GSM or TDMA. The transmission from the client device 22a–22N to the service center 24 may also be made by other wireless communications such as satellite communications. Furthermore, the transmission from the client device 22a–22N to the service center 24 may take the form of a voice call, a circuit-switched data (CSD) call, a short message service (SMS) transmission, a packet data transmission, or some other means of communicating the information over the wireless network.

In response to receiving the starting point and destination point from a client device 22a–22N, the service center 24 calculates a route between the starting point and the destination point. The service center 24 further generates data associated with the calculated route. The generated data may include instructions or other information for the user of the client device 22a–22N regarding the calculated route. As will be described in more detail below, the service center 24 then may determine the memory size of the generated data and further determine whether the data can be transmitted in whole, or in part, to a particular client device 22a–22N. The memory size may be determined automatically based on the make and model of the client 22a–22N. The memory size may also be determined from a database of user selected preferences.

The service center 24 has a server that uses digital map data to calculate a route. The service center 24 may also be configured to receive current traffic information 34 from a service provider or other current traffic source. In that case, the calculated route may also include a consideration for current traffic patterns. After calculating a route, the server generates data associated with the calculated route. The type of data will typically be based on preferences of the user of the client device 22a–22N as well as the physical limitations of the client device 22a–22N (i.e. whether the client device 22a–22N can handle audio, textual, and/or graphical information or whether available wireless coverage exists to the client device 22a–22N over the calculated route).

The server in the service center 24 will then make a determination on whether the data may be sent in whole, or in part, to the client device 22a–22N. This will typically depend on the size of the memory contained in the client device 22a–22N but may also be based on user preference and coverage limits of the device. If the data needs to be sent in parts, the service center 24 will generate a plurality of segmented data files. The first segmented data file is encoded and then transmitted by the service center 24 to a client device 22a–22N via communication B. A determination is made when the next segmented data file needs to be transmitted by the service center 24 to the client device 22a–22N. When this occurs, the next segmented data file is sent to the client device 22a–22N via communication B. This continues until each of the segmented data files are sent to the client device 22a–22N.

As shown in FIG. 1, in one embodiment, the communication B is a cellular wireless communication that is sent through the wireless gateway 28 and, depending on the reception capabilities of the client device 22a–22N, the data files may be sent through the base station antenna 26 or the satellite 30 to the client device 22a–22N. Again, those of ordinary skill in the art, having the benefit of this disclosure, will appreciate that many possible wireless communication methods may be used for communications from the service center 24 to the client device 22a–22N. In one embodiment, the communication is via a digital cellular wireless communication such as CDMA, GSM or TDMA. The transmission from the service center 24 to the client device 22a–22N may also be made by other wireless communications such as satellite communications.

Generally, the client device 22a–22N consists of a wireless communication module and antenna for transmitting and receiving wireless voice and data communications to and from the service center 24. The client device 22a–22N also includes a memory (with limits on data storage) and a microcomputer for performing the main functions of processing the data files received from the service center 24. The client device 22a–22N has a user output means (i.e. speaker, text screen, or graphic screen) to provide instructions and other information regarding the route calculated by the service center 24. The client device 22a–22N may further have a GPS module to understand its current position. As the client device 22a–22N travels along a calculated route, the client device 22 may inform the user of maneuvers along the route.

Additionally, the navigation system 20 may be set up to allow a user of a client device 22a–22N to access the service center 24 via the Internet 36 and a remote device 38. From the remote device 38, a user can inform the service center 24 of the type and model of the client device 22a–22N. This will allow the service center 24 to understand the memory limits of the client device 22a–22N. The user may also inform the service center 24 through the remote device 38 of its preferences on the type of data that it would like to receive from the service center 24 on a calculated route. For example, from remote device 38, the user could require that data about a calculated route be limited to text information (as opposed to voice and graphics). For an increased fee, the user could select additional formatted data such as voice and graphics (depending on the capabilities of the client device 22a–22N).

Furthermore, the user of a client device 22a–22N could inform the service center 24 through the remote device 38 on the type of wireless service available to the client device 22a–22N. For example, some devices may only be limited to one type of digital cellular service while others may have the ability to communicate wireless through a variety of modes. In addition to providing information to the service center 24 through remote device 36, the service center 24 should also have the capability to receive and store information on client preferences and device specific information through a voice call to an operator at the service center 24.

Client Device 22a–22N

Figure 2:
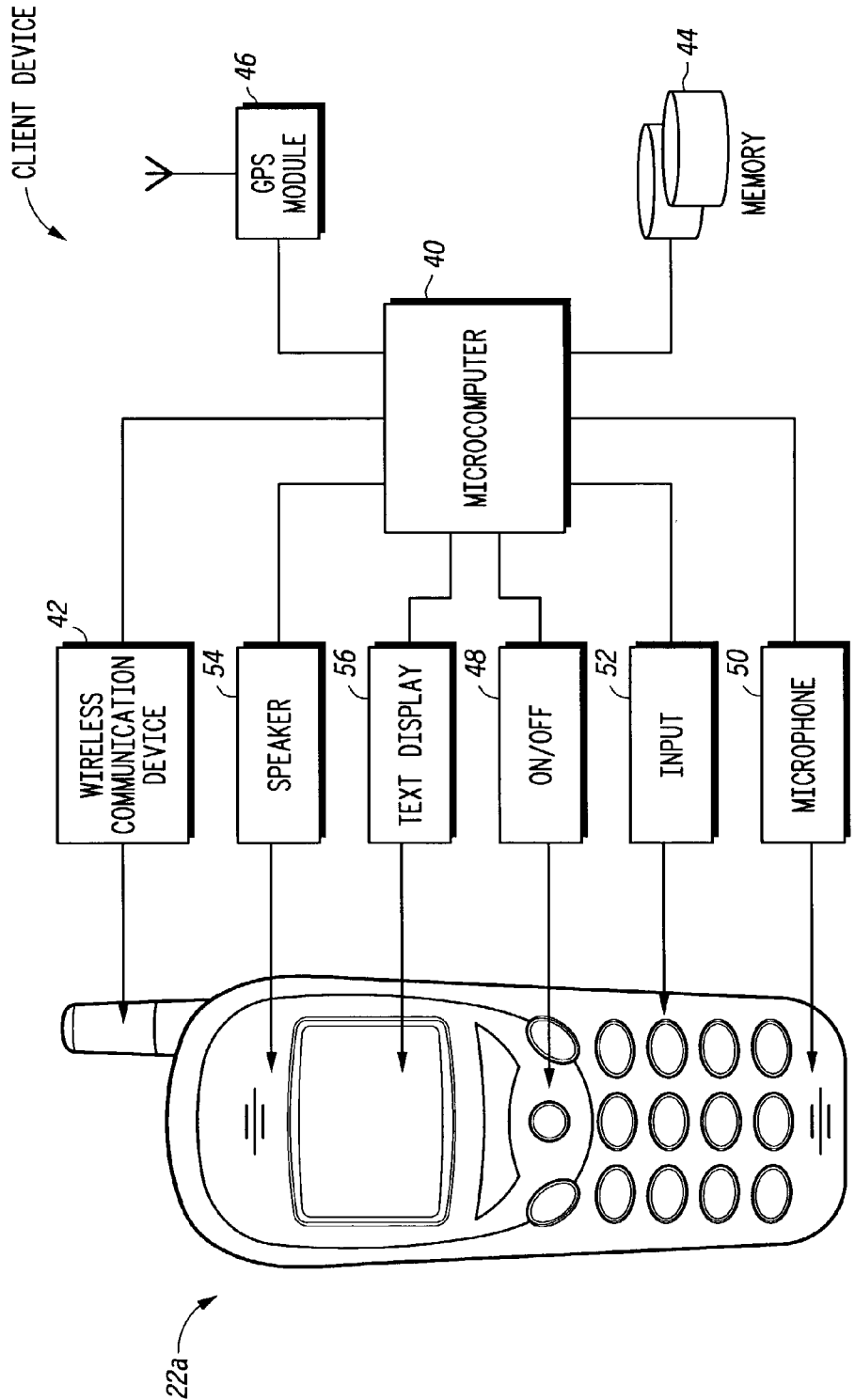
FIG. 2 is a block diagram of one embodiment of a client device that may exist for the navigation system in FIG. 1.
Figure 3:
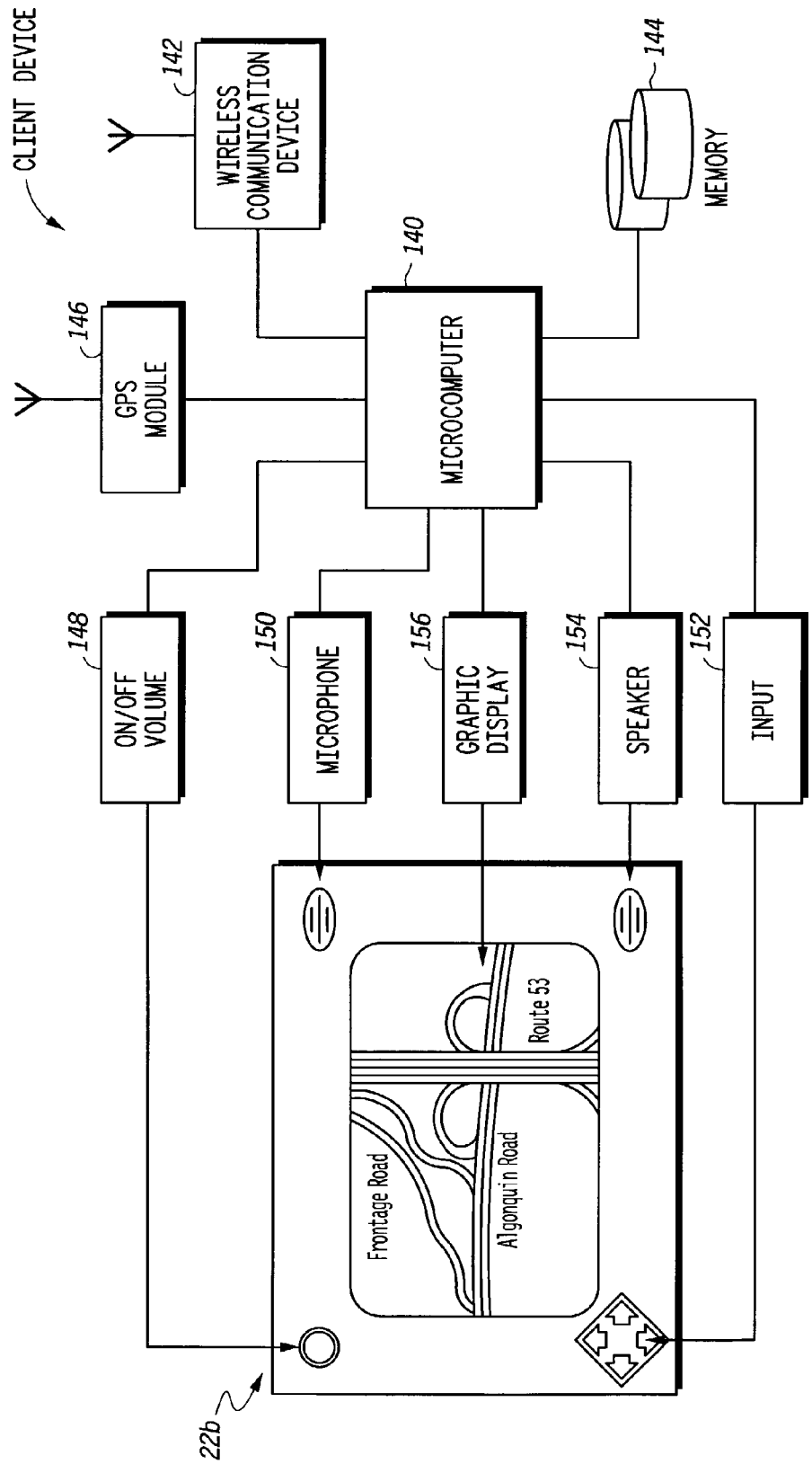
FIG. 3 is a block diagram of another embodiment of a client device that may exist for the navigation system in FIG. 1.

The client devices 22a–22N will now be described in more detail. FIGS. 2 and 3 provide examples of two types of client devices 22a, 22b that may be used in the navigation system 20. The present invention is not limited to these two types of client devices 22a, 22b. One of ordinary skill in the art having the benefit of this disclosure will realize that a variety of devices having wireless communication capabilities may be used here such as phones, in-vehicle navigation units, personal digital assistants (PDAs), and pagers.

Referring to FIG. 2, in one embodiment, a client device 22a is a wireless phone having a microcomputer 40, a wireless communication device 42, and a memory 44. The client device 22a may further include a GPS module 46 to determine a current position, an on/off button 48 to activate/deactivate the device, an input means (such as a microphone 50 and keys 52) and an output means (such as a speaker 54 and/or display 56). The client device 22a may also be part of an in-vehicle hands-free system where the input means is a microphone or data entry board in the vehicle and the output means is the vehicle audio system or navigation screen in the vehicle.

In one embodiment, the wireless communication device 42 includes a transmitter to transmit cellular wireless communications such as AMPS, CDMA, GSM or TDMA. The wireless communication device 42 may also be configured to transmit by other wireless communications such as satellite communications. Furthermore, the transmission may take the form of a voice call, a CSD call, a SMS transmission, a packet data transmission, or some other means of communicating the information over the wireless network.

As explained above, the transmitter is used to transmit to the service center 24 the starting point and destination point of the user. The starting point and destination point may be transmitted by the user to the service center 24 through a voice call or may be transmitted separately or jointly during a digital transmission. The wireless communication device 42 may further, in one embodiment, transmit a request by the client device 22a for additional route information as the client device 22a travels along a calculated route. The wireless communication device 42 may, in another embodiment, be used to transmit a current location of the client device 22a (determined by a client positioning device, such as GPS module 46) along a calculated route to the service center 24. The starting point or current location may also be received by network-based position computing methods such as TDOA or EOTD. The current location would allow the service center 24 to make a determination on whether additional route information needs to be downloaded to the client device 22a.

The client device 22a has a microphone 50 to communicate the starting and/or destination points to the service center 24. Alternatively, the client device may be part of an in-vehicle system to provide hands-free operation for the user. To initiate the voice call, the user activates the on/off button 48 and dials a number via input keys 52 to reach the service center 24. When a communication link is established with the service center 24, the user of the client device 22a can provide at least the desired destination point by speaking into the microphone 50. The user can also provide the starting point during the voice communication or the starting point can be transmitted separately after the client positioning device, such as GPS module 46, determines a current location.

The wireless communication device 42 also includes a receiver to receive and decode the digital data associated with a route calculated and transmitted by the service center 24. Data received from the service center 24 is stored by the client device 22a in memory 44. As will be described in more detail below, the service center 24 may transmit data representing only a portion of the calculated route depending on the storage capability of the memory 44 in the client device 22a. The client device 22a uses the data received and stored in memory 44 to provide instructions or other information to the user regarding the calculated route. The instructions may be voice, text, or graphic instructions depending on the capabilities of the client device 22a–22N and preferences calculated by the user. The receiver may be configured to receive digital cellular communications such as CDMA, GSM or TDMA. The receiver may also be configured to receive other types of wireless communications such as those transmitted by satellites. Furthermore, the reception may take the form of a CSD call, a SMS transmission, a packet data transmission, or some other means of communicating information over the wireless network.

Referring to FIG. 3, in another embodiment, a client device 22b is an invehicle navigation unit having a microcomputer 140, a wireless communication device 142, and a memory 144. The client device 22b may further include a GPS module 146 to determine a current position, an on/off button 148 to activate/deactivate the device and adjust the audio output, an input means (such as a microphone 150 and button 152) and an output means (such as a speaker 154 and/or display 156).

In one embodiment, the wireless communication device 142 includes a transmitter to transmit cellular wireless communications such as AMPS, CDMA, GSM or TDMA. The wireless communication device 142 may also be configured to transmit by other wireless communications such as satellite communications. Furthermore, the transmission may take the form of a voice call, a CSD call, a SMS transmission, a packet data transmission, or some other means of communicating the information over the wireless network.

As explained above, the transmitter is used to transmit to the service center 24 the starting point and destination point of the user. The starting point and destination point may be transmitted by the user to the service center 24 through a voice call or may be transmitted separately or jointly during a digital transmission. The wireless communication device 142 may further, in one embodiment, transmit a request by the client device 22b for additional route information as the client device 22b traverses along a calculated route. The wireless communication device 142 may, in another embodiment, be used to transmit a current location of the client device 22b (determined by a client positioning device, such as GPS module 146) along a calculated route to the service center 24. The starting point or current location may also be received by network-based position computing methods such as TDOA or EOTD. The current location would allow the service center 24 to make a determination on whether additional route information needs to be downloaded to the client device 22b.

The client device 22b has a microphone 150 to communicate the starting and/or destination points to the service center 24. To initiate the voice call, the user activates the on/off button 48 and a predetermined number is dialed to reach the service center 24. The on/off button 48 may be a single button press or accessible through a menu screen. When a communication link is established with the service center 24, the user of the client device 22b can provide at least the desired destination point by speaking into the microphone 150. The user can also provide the starting point during the voice communication or the starting point can be transmitted separately after the client positioning device, such as GPS module 146, determines a current location.

The wireless communication device 142 also includes a receiver to receive and decode the digital data associated with a route calculated and transmitted by the service center 24. Data received from the service center 24 is stored by the client device 22b in memory 144. As will be described in more detail below, the service center 24 may transmit data representing only a portion of the calculated route depending on the storage capability of the memory 144 in the client device 22b. The storage capability of memory 144 is likely to be different from the memory 44 in the client device 22a shown in FIG. 2. The client device 22b uses the data received and stored in memory 144 to provide instructions or other information to the user regarding the calculated route. Here, as opposed to the client device 22a in FIG. 2, the client device 22b may have the capability of displaying higher resolution graphical information to the user via a graphic display 156. The receiver may be configured to receive digital cellular communications such as CDMA, GSM or TDMA. The receiver may also be configured to receive other types of wireless communications such as those transmitted by satellites. Furthermore, the reception may take the form of a CSD call, a SMS transmission, a packet data transmission, or some other means of communicating information over the wireless network.

Service Center 24

Figure 4:
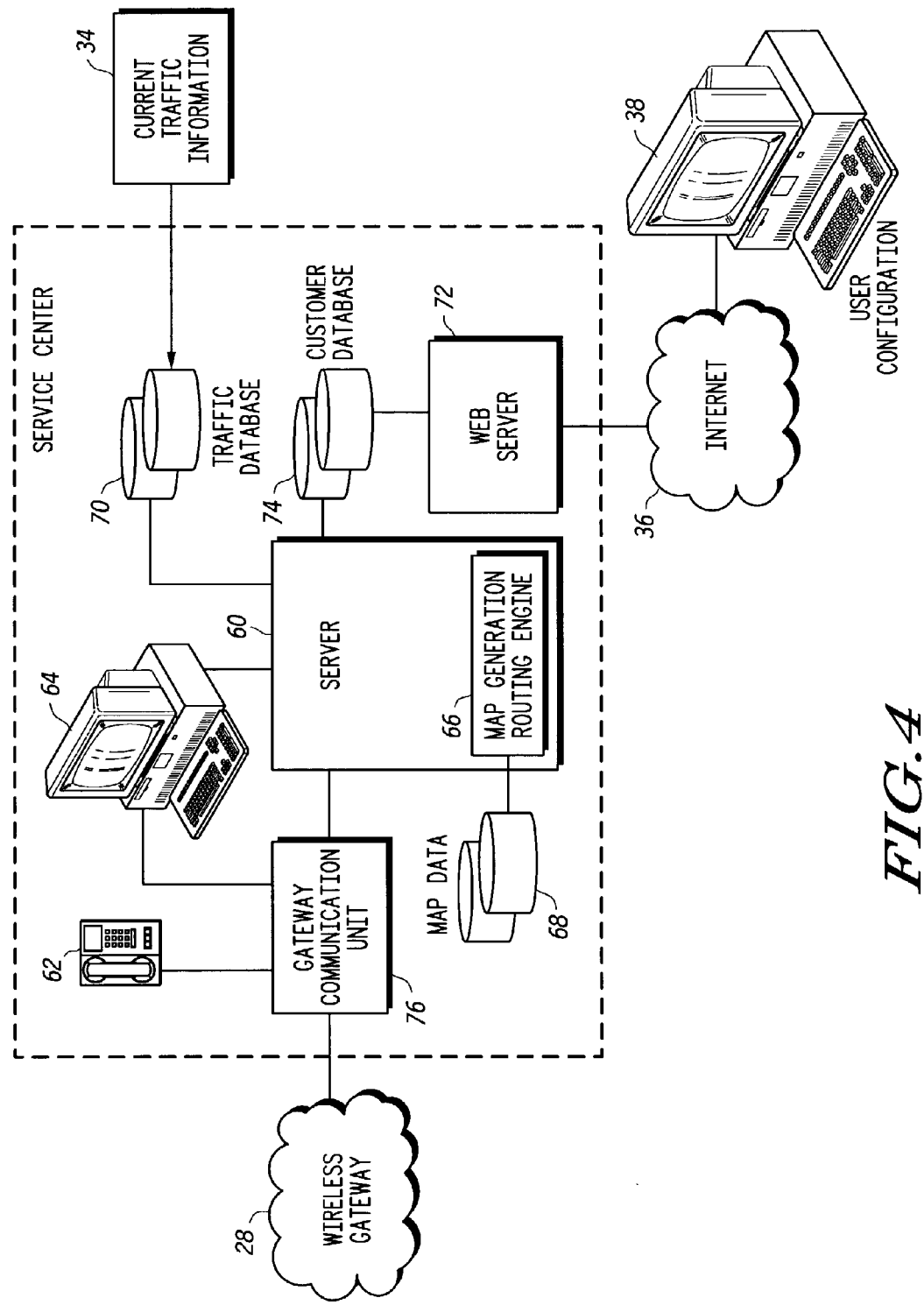
FIG. 4 is a block diagram showing further details of one embodiment of a service center in FIG. 1.

The service center 24 of the navigation system 20 will now be described in more detail. Referring now to FIG. 4, at the heart of the service center 24 is a server 60. Depending on the specific implementation of the system, additional components that may be included in the service center 24 comprise a telephone 62, a computer terminal 64, a map generation and routing engine 66, a map data store 68, a traffic database 70, a web server 72, a customer database 74, and a gateway communication unit 76.

The service center 24, through server 60, performs several functions including receiving the starting point and destination point, calculating a route based on the received locations, generating data associated with the calculated route, determining whether all of, or a part of, the generated data may be transmitted to the client device 22a–22N, and transmitting data (in whole or in part) to the client device 22a–22N. These functions will be explained in the context of the block diagram in FIG. 4 and the flow diagrams in FIGS. 5 and 6A–6C. The functions may be software coded processing steps that are programmed as operating instructions for the server 60 in the service center 24.

Figure 5:
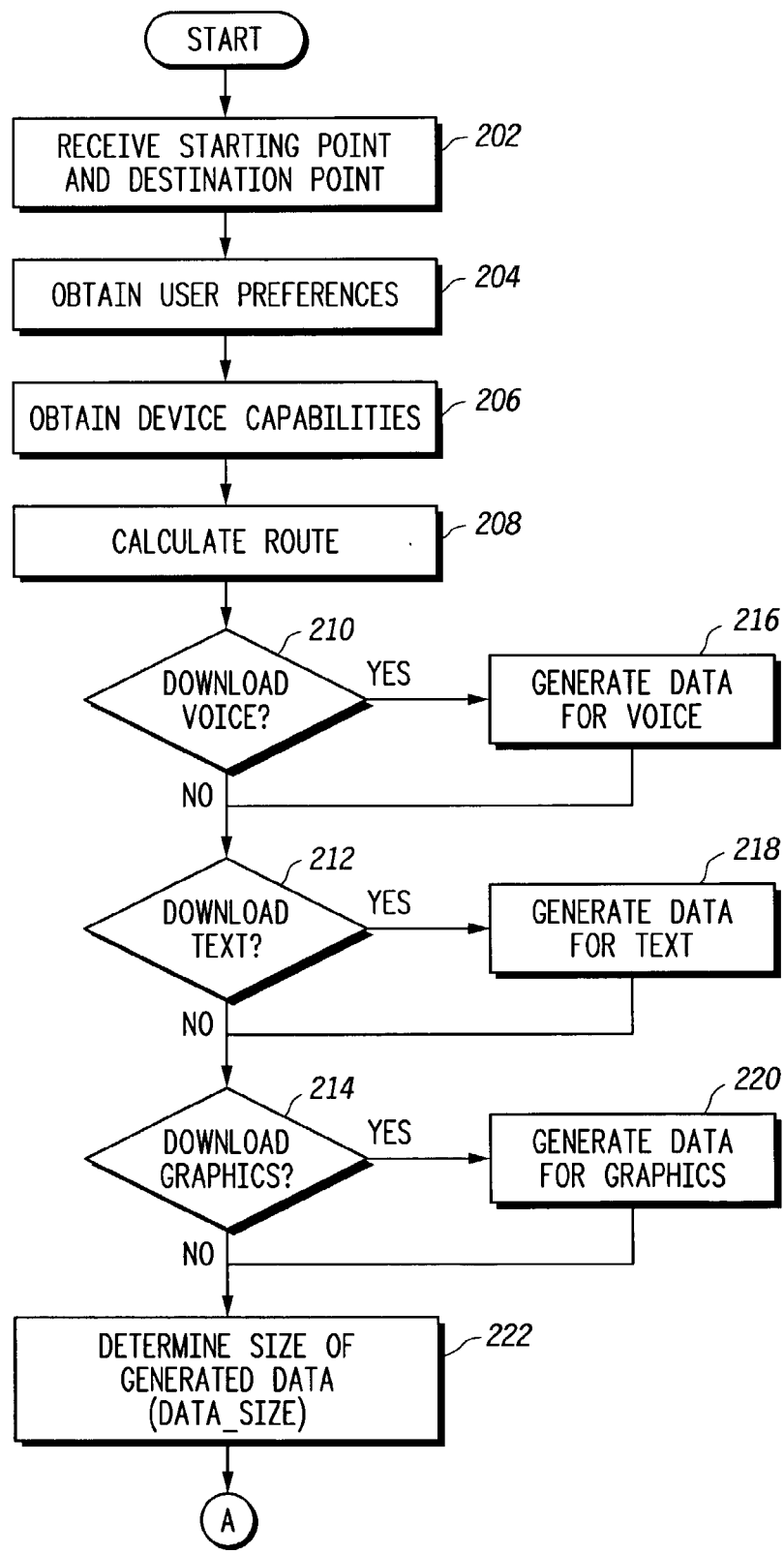
FIG. 5 is a flow diagram illustrating one embodiment of a method within a service center for calculating a route and generating data associated with the calculated route.

FIG. 5 shows a flow diagram illustrating one embodiment of a method in the service center 24 for performing the functions of receiving the starting point and destination point, calculating a route based on the received locations, and generating data associated with the calculated route. In block 202 of FIG. 5, the service center 24 receives the starting point and destination point transmitted by the client device 22a–22N. Referring back to FIG. 4, in one embodiment, the service center 24 may obtain this data through the telephone 62 and the computer terminal 64. In this embodiment, an operator at the service center 24 may use the telephone 62 to receive voice communications from the user of the client device 22a–22N. The operator may be a live person or an automated voice recognition system. During the voice communication, the user of the client device 22a–22N can provide the operator with the starting point and destination point. The operator may then enter, or otherwise input, the starting point and destination point into the computer terminal 64. In this embodiment, the server 60 receives the starting point and destination point from the computer terminal 64. Alternatively, in another embodiment, the client device 22a–22N may be configured to directly transmit the starting point and/or destination point to the server 60 via a digital transmission through the gateway communication unit 76. For example, a client positioning device, such as a GPS module, in the client device 22a–22N may determine the current position of the client device 22a–22N and transmit that information to the server 60 as the starting point of the route. The client device 22a–22N could also be configured to allow the user to type or otherwise manually enter the destination point. The entered destination point could be encoded and transmitted to the server 60 via a digital transmission. The starting point or current location may also be received by network-based positioning computing methods such as TDOA or E-OTD.

In blocks 204 and 206 of FIG. 5, the service center 24 obtains the user preferences and device capabilities (or limitations). As will be seen below, information regarding user preferences and device capabilities is important for route selection, data generation, and transmittal of data to the client device 22a–22N.

In block 208 of FIG. 5, the service center 24 calculates a route based, at least in part, on the received starting and destination points. Referring to FIG. 4, the server 60 in the service center 24 uses the map generation and routing engine 66 to calculate a route. The map generation and routing engine 66 may be a separate component or integral to the server 60. The server 60 uses the map generation and routing engine 66 to select a route based on the received starting and destination points. Connected to the map generation and routing engine 66 is stored digital map data 68 that is used to calculate a route from the starting point to the destination point. Map generation and routing engines and digital map data are known in the art.

The service center 24 may also be configured to receive current traffic information 34. In one embodiment, the server 60 is connected to a traffic database 70 that stores and updates information received from a service provider or other current traffic source. Through this connection, the server 60 can access the traffic database during route calculation. The source of the current traffic information 34 is preferably from a service provider that can provide current traffic information in a digital format. Known service providers can provide digital information obtained from sensors deployed on the roadways that detect traffic flows. Sensors to detect traffic speed, time and congestion have been known since before 1990. Accordingly, the actual construction and operation of such sensors to detect current traffic information 34 is implementation specific. The present invention may use current traffic information 34 obtained from any type of these well-known sensors.

Route calculation may also consider previously selected preferences by the user of the client device 22a–22N. In one embodiment, the service center 24 further includes a web server 72 and a customer database 74. The web server 72 is connected to the Internet 36 to allow the user to access the service center 24 via a remote device 28. For example, from remote device 38, the user could require that route calculation include or not include the consideration of current traffic information. Information received through web server 72 is stored and updated in the customer database 74. The server 60 may be connected to the customer database 74 to allow the server 60 to access the customer database during route calculation and generating of the data associated with the calculated route.

After a route is calculated by the service center 24, the process may proceed to a series of decision blocks 210, 212, 214. These decision blocks 210, 212, 214 are used to determine the type of data generated associated with the calculated route for use by the client device 22a–22N. For example, decision block 210 may ask whether data associated with voice instructions and commands should be generated relating to the calculated route. The decision on whether to generate voice data may be based on user preferences and the capabilities (or limitations) of the client device 22a–22N. For instance, if the client device 22a–22N does not have an audio speaker or the user does not want audio commands, the process would continue to decision block 212 and no data will be generated associated with voice instructions and commands.

On the other hand, if the client device 22a–22N can support voice instructions and commands and the user is not adverse to such instructions and commands, the process would proceed to block 216 where data associated with voice instructions and commands is generated by the service center 24. Data associated with voice instructions may be in a variety of forms. For example, in one embodiment, the service center 24 may generate compressed voice files (such as MP3 files) associated with each maneuver point along the calculated route. Alternatively, the service center 24 may generate token numbers associated with prerecorded messages stored in the client device 22a–22N. The token numbers themselves would be transmitted to the client device 22a–22N and may be used by the device to form a string of prerecorded words and phrases to instruct or guide a user along a calculated route. A preferred embodiment is to use a combination of pre-recorded words and phrases with downloaded voice files for unique words or names associated with the route.

In decision block 212 of FIG. 5, the process may ask whether data associated with text instructions and commands should be generated relating to the calculated route. The decision on whether to generate text data may be based on user preferences and the capabilities (or limitations) of the client device 22a–22N. For instance, if the client device 22a–22N does not have a text screen or the user does not want text commands, the process would continue to decision block 214 and no data will be generated associated with text instructions and commands.

On the other hand, if the client device 22a–22N can support text instructions and commands and the user is not adverse to such instructions and commands, the process would proceed to block 218 where data associated with text instructions and commands is generated by the service center 24. Data associated with text instructions may be in a variety of forms. For example, in one embodiment, the service center 24 may generate warning and instructions for each maneuver point along the calculated route. Alternatively, the service center 24 may generate token numbers associated with prerecorded text messages stored in the client device 22a–22N. The token numbers themselves would be transmitted to the client device 22a–22N and may be used by the device to form a string of prerecorded text words and phrases to instruct or guide a user along a calculated route.

In decision block 214 of FIG. 5, the process may ask whether data associated with graphic instructions and commands should be generated relating to the calculated route. The decision on whether to generate graphic data may be based on user preferences and the capabilities (or limitations) of the client device 22a–22N. For instance, if the client device 22a–22N does not have a graphic screen or the user does not want graphic commands, the process would continue to block 222 and no data will be generated associated with graphic instructions and commands.

On the other hand, if the client device 22a–22N can support graphic instructions and commands and the user is not adverse to such instructions and commands, the process would proceed to block 220 where data associated with graphic instructions and commands is generated by the service center 24. Data associated with graphic instructions may be in a variety of forms. For example, in one embodiment, the service center 24 may generate information associated with the topology of the calculated route. The client device 22a–22N may use the topology information, in conjunction with map generation software, to generate an overall map of the area with the calculated route. Another embodiment may include information representing a graphical icon representing a maneuver instruction to be displayed just prior to a maneuver on the calculated route. For example, a maneuver icon could show an arrow pointing in the direction to turn or a topological representation of the intersection. A further embodiment may include a bitmap image having information illustrating traffic conditions or congestions at certain points along the calculated route.

Further, it should be noted that the decision on what type of data to generate for a particular maneuver might be based on governmental regulations. There may be certain geographic areas that have regulations on the type of navigation data presented to the user. Based on coverage maps indicating where regulations exist, the service center 24 may not generate certain types of data. For example, a government regulation may prohibit some types of maneuver prompting such as detailed graphic displays. This could be taken into account when determining the type of data being generated.

In block 222 of FIG. 5, the process may then determine the size of all the data generated associated with voice, text and/or graphical instructions and commands for the calculated route. The information regarding the size of all data may be stored in memory (data_size). Alternatively, the size of each type of data may be individually determined and summed together.

Figure 6A:
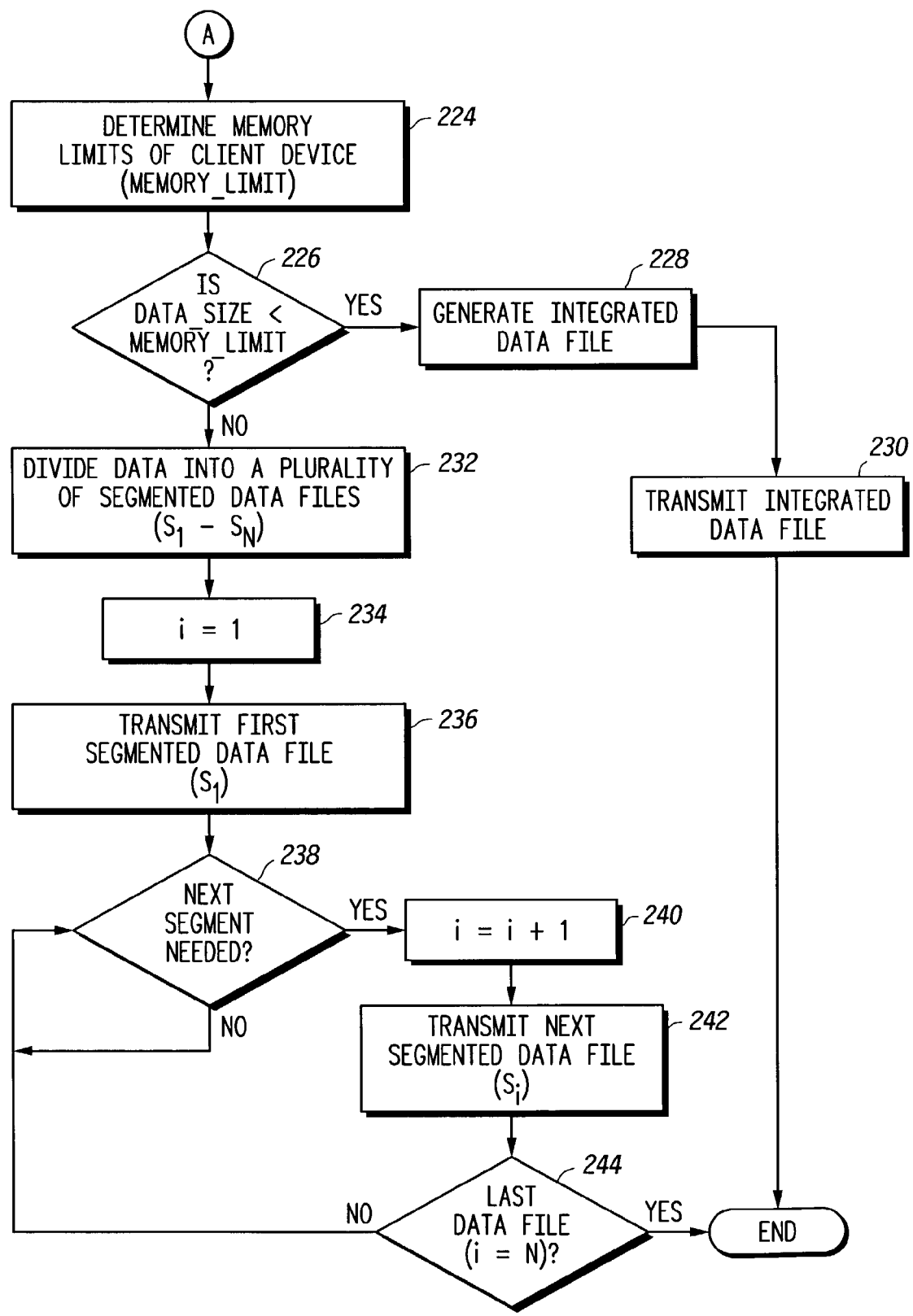
FIG. 6A is a flow diagram illustrating one embodiment of a method within a service center for determining the memory size of a client device, dividing the data associated with a calculated route into segmented data files, and transmitting the segmented data files to the client device.

FIG. 6A is a continuation of FIG. 5 and shows a flow diagram illustrating one embodiment of a method in the service center 24 for performing the functions of determining whether all of, or part of, the generated data may be transmitted to the client device 22a–22N, and transmitting the data (in whole or in part) to the client device 22a–22N. In block 224 of FIG. 5, the service center 24 determines or otherwise obtains the storage capability or memory limit of the client device 22a–22N (memory_limit). In one embodiment, this can be done by checking the customer database 74 to ascertain the type and model of the client device 22a–22N. The storage capability or memory limit may be either user defined or operator defined to represent the maximum storage capability of the client device 22a–22N for retaining data at any given time. In another embodiment, the client device 22a–22N may be configured to transmit to the service center 24 information identifying itself at the time a request is made for a navigation route. The information identifying itself would then include the storage capability, memory limits, or remaining available memory of the client device 22a–22N. A dialog between the service center 24 and the client device 22a–22N may further be needed to query the available memory in the client device 22a–22N.

The process then proceeds to decision block 226. In decision block 226, a decision is made whether the size of the data associated with the calculated route (data_size) is less than the storage capability or memory limits of the client device 22a–22N (memory_limit). If the data associated with the calculated route (data_size) is less than the memory limits of the client device 22a–22N (memory_limit), the process proceeds to block 228 where the data associated with the calculated route may be integrated into a data file. The integrated data file would include information for the client device 22a–22N to provide voice, text, and/or graphic instructions and commands to the user. After the integrated data file is generated, the entire data file is encoded and then transmitted to client device 22a–22N in process block 230. The transmission may be immediate or, if the client device is being used for other purposes (such as a voice call), the data for transmission may be stored until the data can be sent.

If, however, the data associated with the calculated route (data_size) is greater than the storage capacity or memory limits of the client device 22a–22N (memory_limit), the process proceeds to block 232 where the data is divided into segments. In block 232, in one embodiment, the generated data associated with the calculated route (in blocks 216, 218, and/or 220) is divided into segmented data files ($S_1$–$S_N$). The division of data may be done in a variety of ways but should have some relation to the storage capacity or memory limits of the client device 22a–22N (memory_limit).

Figure 7A:
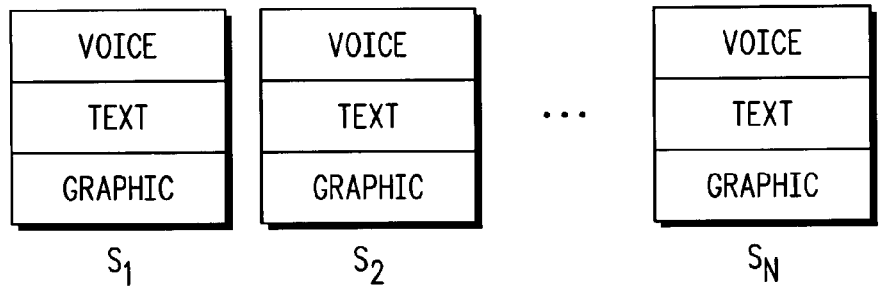
FIGS. 7A–7C illustrate different ways that data associated with a calculated route may be divided into segmented data files for transmission to the client device.

In one embodiment, as shown in FIG. 7A, the generated data associated with the calculated route may be divided geographically into a plurality of segmented data files ($S_1$, $S_2$, ... $S_N$), each representing a geographic region along the calculated route. The size of each segmented data file ($S_1$, $S_2$, ... $S_N$) is less than the storage capacity or memory limit of the client device 22a–22N. In this embodiment, a client device 22a–22N that cannot store the entire route will incrementally receive geographic portions of the calculated route as it proceeds along the route and through different geographic regions. The service center 24 transmits a first segmented data file ($S_1$) associated with a first geographic region of the calculated route. The client device 22a–22N receives the first segmented data file ($S_1$) and processes the data to provide instructions and commands for the user to traverse along the calculated route within the first geographic region. The data file may contain information to provide voice, text and/or graphical instructions and commands to the user within the first geographic region. As the client device 22a–22N progresses along the route, and into the next geographic region, the old segmented data file ($S_1$) may be discarded and a new segmented data file ($S_2$) would be transmitted by the service center 24 and received by the client device 22a–22N.

Figure 7B:
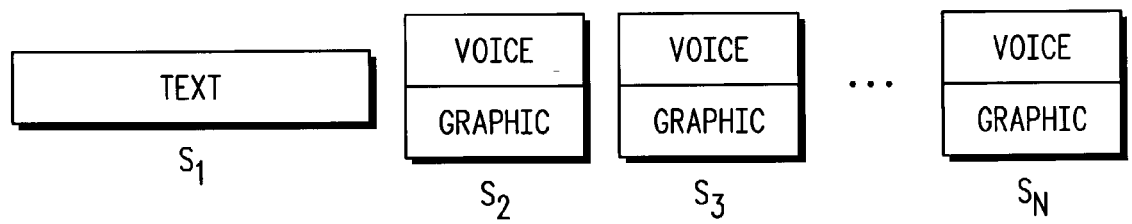

In another embodiment, as shown in FIG. 7B, the generated data associated with a calculated route may take into consideration of the type of data. For example, the first segmented data file ($S_1$) would include just the data associated with textual instructions and commands to the user for the entire calculated route. Text type data typically requires less storage space than certain types of voice and graphic data. The remaining segmented data files ($S_2, S_3, \ldots S_N$) would include data for voice and graphic instructions and commands divided by geographic regions. As the client device 22a–22N progresses along the route, the client device 22a–22N would incrementally receive and store the remaining segmented data files ($S_2, S_3, \ldots S_N$) in addition to the already stored textual information in the first segmented data file ($S_1$). In this case, the first segmented data file ($S_1$) should be substantially smaller than the storage capacity or memory limits of the client device 22a–22N. The remaining segmented data files ($S_2, S_3, \ldots S_N$) would need to be divided up in such a way so that the size of each data file is less than the difference between the memory limit of the client device 22a–22N and the size of the first segmented data file ($S_1$).

The examples in FIGS. 7A and 7B are exemplary. Those of ordinary skill in the art having the benefit of this disclosure will realize that other ways to segment or other divide the data are possible without departing from the spirit of the present invention.

Referring back to FIG. 6A, regardless of how the data is segmented or otherwise divided, the process may proceed to block 234 where a counter may be initialized (i=1). The process continues to block 236 where the first segmented data file ($S_1$) is transmitted by the service center 24 to the client device 22a–22N. The transmission may be immediate or, if the client device is being used for other purposes (such as a voice call), the data for transmission may be stored until the data can be sent. At decision block 238, the service center 24 then waits until the next segmented data file needs to be transmitted to the client device 22a–22N. When the service center 24 determines that the next segmented data file needs to be transmitted to the client device 22a–22N, the process continues to process block 240. Otherwise, the service center 24 returns to decision block 238 and waits.

Figure 6B:
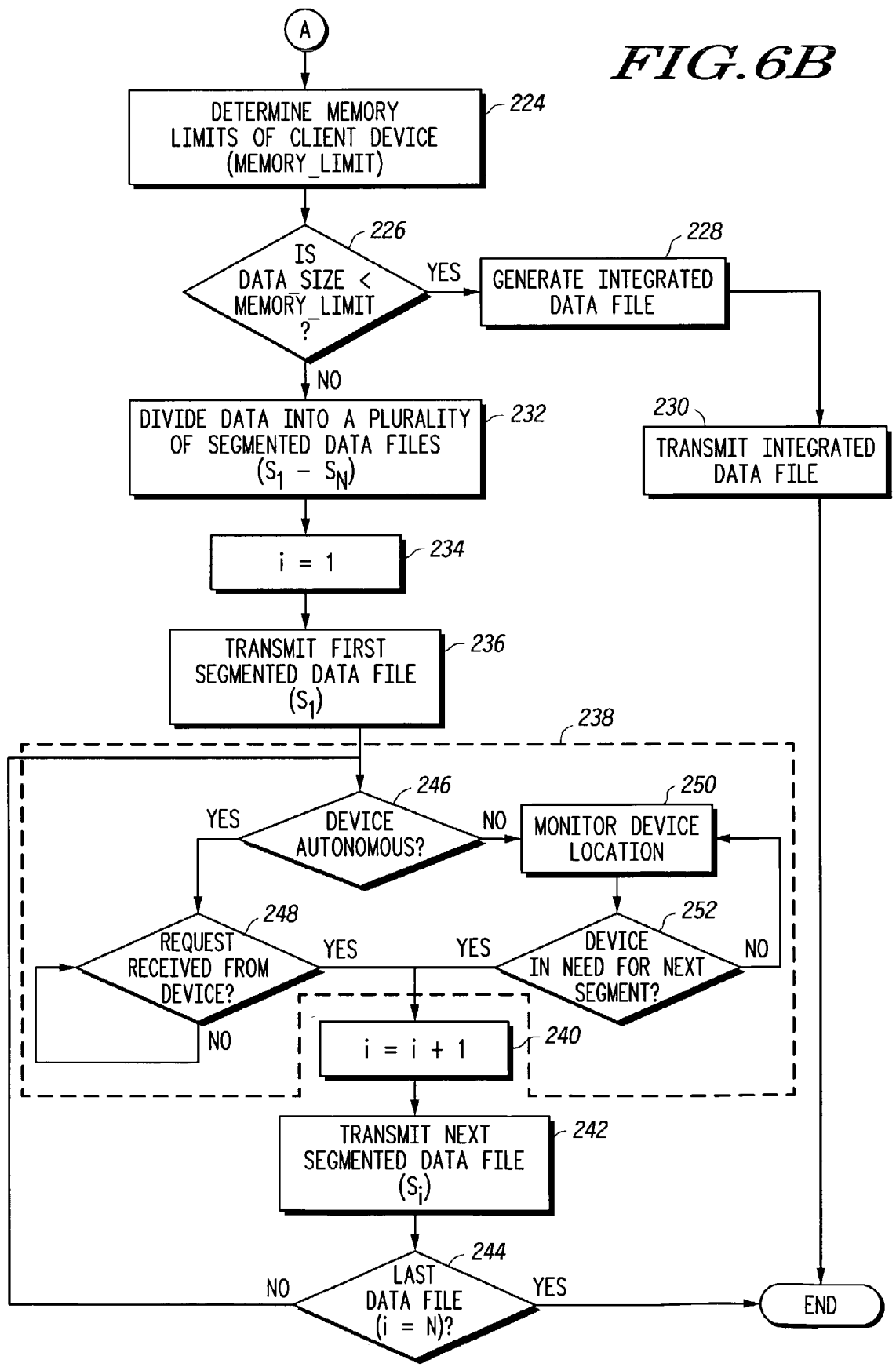
FIG. 6B is a flow diagram illustrating another embodiment of a method within a service center for determining the memory size of a client device, dividing the data associated with a calculated route into segmented data files, and transmitting the segmented data files to the client device.

Referring to decision block 238, there are a variety of ways that the service center 24 may determine that the client device 22a–22N needs another segmented data file. In one embodiment, as shown in FIG. 6B, the determination of whether another segmented data file is needed depends on whether the client device 22a–22N is operating autonomously as shown in decision block 246. Here, autonomous refers to a client device 22a–22N that is configured to send requests for additional data segments from the service center 24.

If the client device 22a–22N is autonomous, the client device 22a–22N will be configured to establish a communication with the service center 24 as the client device 22a–22N is reaching the end of a geographic region (covered by the segmented data file presently stored in the client device 22a–22N). Once a communication is established between the client device 22a–22N and the service center 24, the client device 22a–22N will then make a request to the service center 24 to send the next segmented data file. Accordingly, when the client device 22a–22N is operating autonomously, the service center 24 will wait until it gets a request from the client device 22a–22N that it needs the next segmented data file (as shown in decision block 248). It should be noted that in some forms of wireless communications, such as general packet radio service (GPRS), there is a type of virtual connection that allows the user to always be connected to the network. This is particularly suitable for client devices 22a–22N that are configured to operate autonomously. When the service center 24 receives the request from the client device 22a–22N, the process continues to process block 240. Otherwise, the service center 24 returns to decision block 248 and waits.

Referring back to decision block 246, if the client device 22a–22N is not operating autonomously, the service center 24 monitors the location of the client device 22a–22N. In one embodiment, the service center 24 monitors the location of the client device 22a–22N through network based positioning computing means such as TDOA or E-OTD. In another embodiment, the service center 24 monitors the location of client device 22a–22N by initiating a dialog with the client device 22a–22N to query the client positioning device, such as GPS module 46, 146, in the client device 22a–22N. This can be done at select intervals when it is expected that the client device 22a–22N is reaching the end of a geographic region on the calculated route.

After a determination is made that a new segmented data file needs to be transmitted to the client device 22a–22N, the process proceeds to block 240. At block 240, the counter is incremented (i=i+1) and the process proceeds to block 242. At block 242, the service center 24 transmits the next segmented data file ($S_i$). Again, the transmission may be immediate or, if the client device is being used for other purposes (such as a voice call), the data for transmission may be stored until the data can be sent later. After the next segmented data file ($S_i$) is transmitted by the service center 24, the process proceeds to decision block 244 where a decision is made whether the last data file has been transmitted by the calculated route (whether i=N). If the last data file has been transmitted, the process ends. If the last data file has not been transmitted, the process continues back at decision block 238 where the service center 24 waits until the next segmented data file is needed by the client device 22a–22N.

Figure 6C:
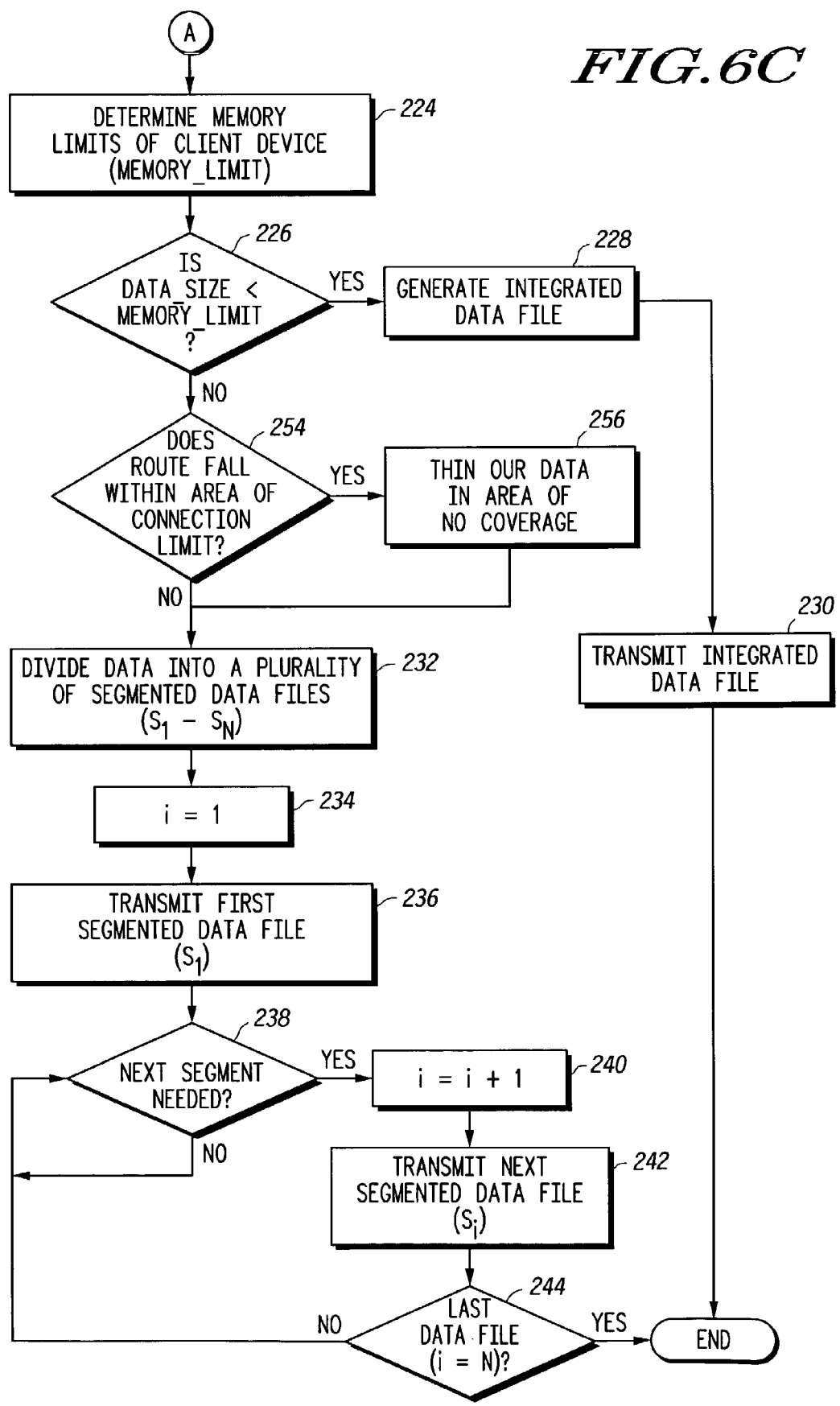
FIG. 6C is a flow diagram illustrating a further embodiment of a method within a service center for determining the memory size of a client device, dividing the data associated with a calculated route into segmented data files, and transmitting the segmented data files to the client device.

In another embodiment, as illustrated in FIG. 6C, the method in the service center 24 for performing the functions of determining whether all of, or part of, the generated data may be transmitted to the client device 22a–22N, and transmitting the data (in whole or in part) to the client device 22a–22N, further includes a consideration of the connection limitations of the client device 22a–22N. Connection limitations may be either coverage or bandwidth constraints. The method in FIG. 6C is similar to that described in FIG. 6A except that it adds decision block 254 and process block 256. In particular, in one embodiment, after it has been determined that the data size of the data associated with the route is greater than the storage capability or memory limit of the client device 22a–22N (block 226), the process includes a decision (at block 254) whether the calculated route falls within an area that has a connection limitation for the client device 22a–22N. These connection limits can be network operator driven based on desired network loading concerns. If there is a high traffic load on the network, a network operator may prefer to be able to reduce the usage of route data information so that other customers can make voice calls. Accordingly, the network operator could configure the system to reduce or thin the data in a certain geographic or coverage area.

Furthermore, a connection limit may be based on cost concerns to the user of the client device. Certain types of transmissions may be more expensive than other data transmissions, but afford faster transmission times and higher bandwidth. A user may not care about the cost and configure options to transmit at higher cost methods. Alternatively, the user may be sensitive to cost and require that the cost of the transmission play a role is the level of detail of navigation instructions or the type of data being transmitted. In any event, if the calculated route falls within an area of limited connectivity, the process continues to block 256.

Figure 7C:
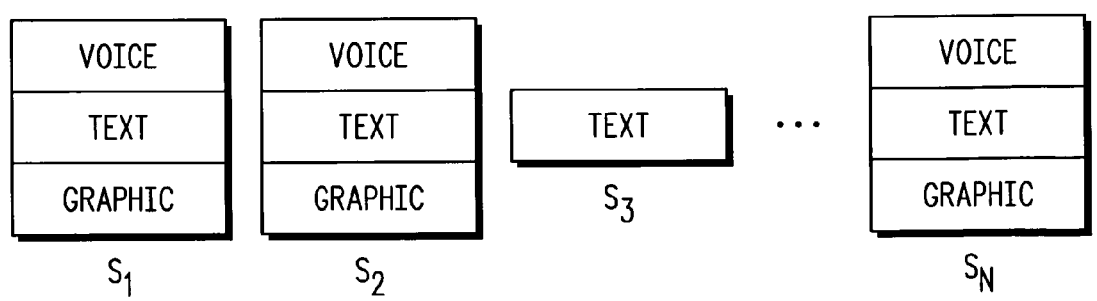

At block 256, the service center 24 thins out the data associated with a calculated route over the geographic area that has a connection limitation based on coverage maps indicating areas where connections of various types are possible. In other words, the level of detail of the calculated route is adjusted based upon the memory size and expected capability to remain in contact with the service center 24. In some areas, the wireless connection may have slower data rates and in some areas, a wireless connection may not be possible. Further, as mentioned above, conection limits may be driven by a network operator. For example, if the service center 24 determines that the client device 22a–22N will be moving into an area where there is no wireless network coverage, it may download less detail to enable it to transmit information for a larger distance of the calculated route. One way of downloading less detail is to include only textual data for a specific geographic region. If this still is too much data, then the route data may simply be a list of maneuver points along the route. An example of thinning out of data is illustrated in FIG. 7C. In FIG. 7C, the first and second segmented data files ($S_1$ and $S_2$) cover geographic regions where there is no problem with coverage or bandwidth. The third segmented data file ($S_3$) covers an extended geographic area on the route where there is very limited connectivity. The intent is to maintain some route navigation data available, perhaps at a degraded level of service, until full wireless network coverage is again present. The thinned out data should be taken into consideration when dividing the data into a plurality of segmented data files ($S_1$–$S_N$).

If there is a geographical area along the calculated route with limited connectivity, process block 232 should further include divisions such that the beginning or ending of a segmented data file falls within a geographical area having good wireless coverage and bandwidth with allowances for the download duration and the speed and direction of travel along the planned route. This is important because the client device 22a–22N may end up losing route navigation data if route data needs to be transmitted at a location with limited connectivity. To make a determination of whether a calculated route passes through a geographical area with limited connectivity, the service center 24 may use the customer database to determine the wireless service plan covering the client device 22a–22N.

Figure 6D:
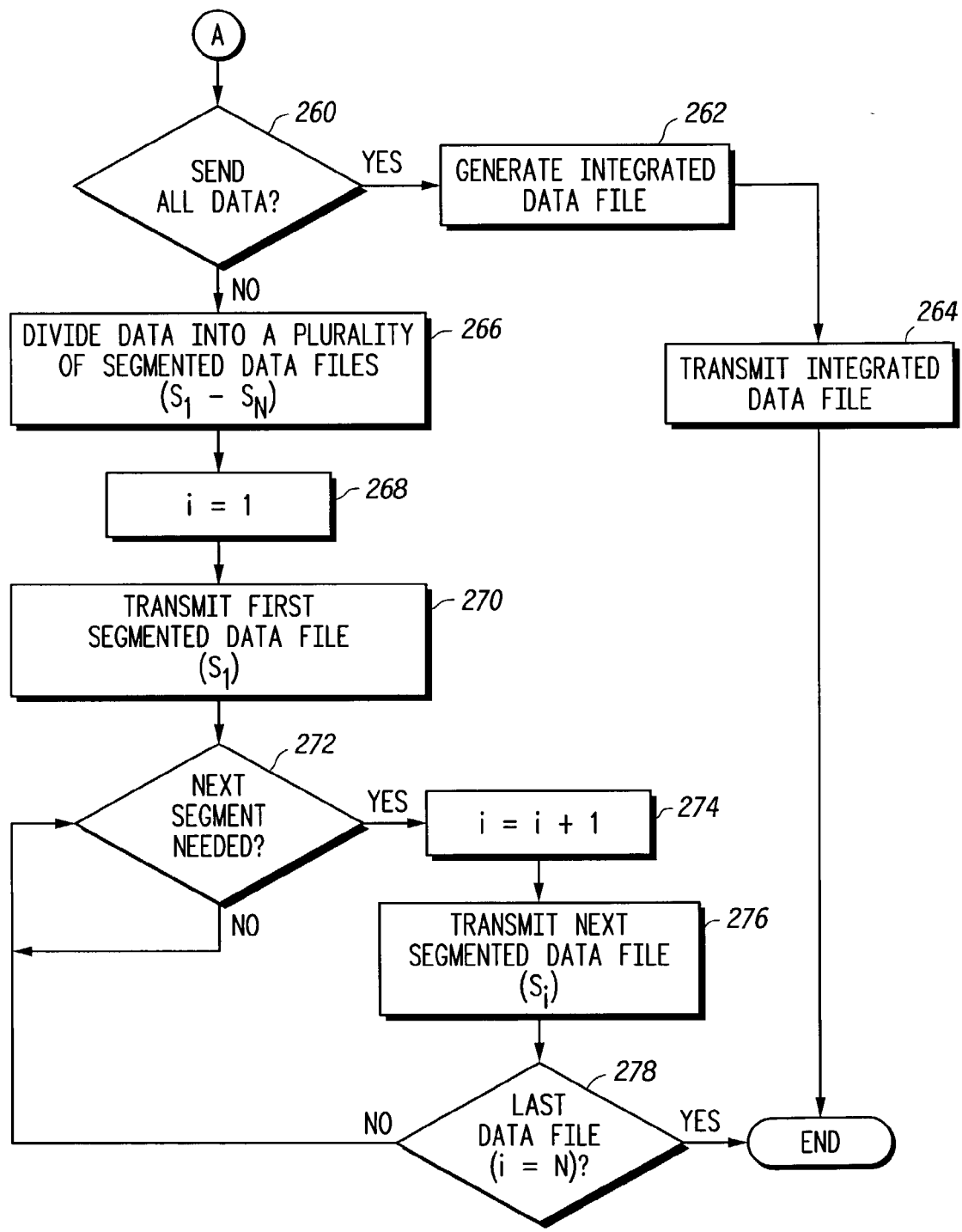
FIG. 6D is a flow diagram illustrating a further embodiment of a method within a service center for determining whether all data should be sent to a client device, dividing the data associated with a calculated route into segmented data files, and transmitting the segmented data files to the client device.

FIG. 6D illustrates a further embodiment of the present invention and shows a flow diagram for a method in the service center 24 for performing the functions of determining whether all of, or part of, the generated data may be transmitted to the client device 22a–22N, and transmitting the data (in whole or in part) to the client device 22a–22N. This flow diagram is similar to that in FIG. 6A but does not require a consideration of the memory limits of the device. Although it may be possible to download all the data to the client device at one time, it may not be the most cost effective or most efficient use of available bandwidth. FIG. 6D takes these concerns into account. The flow diagram could also be integrated into the flow process of FIG. 6A; for example, after it is determined that there is sufficient memory in a client device to transmit all the data.

In one embodiment, the process proceeds to decision block 260 where a decision is made whether all the data should be sent. Again, this could include a consideration of available memory limits in the client device, but is not required. Instead, other considerations may be included such as whether it is cheaper to send all the data immediately or divide the data into segment data files. For example, cost may be a concern to a user. Thus, a consideration may be made on whether it is cheaper to transmit the data all at one time or divide it up into segments.

Alternatively, for example, even if the memory of the client device could accept all the data, a network provider may not wish to allow the transmission of all the data to the client device at a particular point in time because it may affect other services being provided to other customers. Accordingly, the network operator may wish to require the transmission of the data through a plurality of segmented data files.

If all the data associated with the calculated route may be transmitted to the client device immediately, the process proceeds to block 262 where the data associated with the calculated route may be integrated into a data file. The integrated data file would include information for the client device 22a–22N to provide voice, text, and/or graphic instructions and commands to the user. After the integrated data file is generated, the entire data file is encoded and then transmitted to client device 22a–22N in process block 264.

If, however, all the data associated with the calculated route should not be transmitted immediately, the process proceeds to block 266 where the data is divided into segments. In block 266, in one embodiment, the generated data associated with the calculated route (in blocks 216, 218, and/or 220) is divided into segmented data files ($S_1$–$S_N$). The division of data may be done in a variety of ways but may have some relation to transmission costs or available bandwidth constraints.

In one embodiment, the generated data associated with the calculated route may be divided geographically into a plurality of segmented data files ($S_1$, $S_2$, . . . $S_N$), each representing a geographic region along the calculated route. The size of each segmented data file ($S_1$, $S_2$, . . . $S_N$) would be selected based on factors such as transmission costs or available bandwidth concerns. The service center 24 transmits a first segmented data file ($S_1$) associated with a first geographic region of the calculated route. The client device 22a–22N receives the first segmented data file ($S_1$) and processes the data to provide instructions and commands for the user to traverse along the calculated route within the first geographic region. The data file may contain information to provide voice, text and/or graphical instructions and commands to the user within the first geographic region. As the client device 22a–22N progresses along the route, and into the next geographic region, the old segmented data file ($S_1$) may be discarded and a new segmented data file ($S_2$) would be transmitted by the service center 24 and received by the client device 22a–22N.

In another embodiment, the generated data associated with a calculated route may take into consideration of the type of data. For example, the first segmented data file ($S_1$) may include just the data associated with textual instructions and commands to the user for the entire calculated route. Text type data typically requires less storage space than certain types of voice and graphic data. The remaining segmented data files ($S_2$, $S_3$,. . . $S_N$) may include data for voice and graphic instructions and commands divided by geographic regions. As the client device 22a–22N progresses along the route, the client device 22a–22N would incrementally receive and store the remaining segmented data files ($S_2$, $S_3$, . . . $S_N$) in addition to the already stored textual information in the first segmented data file ($S_1$).

Regardless of how the data is segmented or otherwise divided, the process may proceed to block 268 where a counter may be initialized (i=1). The process continues to block 270 where the first segmented data file ($S_1$) is transmitted by the service center 24 to the client device 22a–22N. At decision block 272, the service center 24 then waits until the next segmented data file needs to be transmitted to the client device 22a–22N. When the service center 24 determines that the next segmented data file needs to be transmitted to the client device 22a–22N, the process continues to process block 274. Otherwise, the service center 24 returns to decision block 272 and waits.

At block 274, the counter is incremented (i=i+1) and the process proceeds to block 276. At block 276, the service center 24 transmits the next segmented data file ($S_i$). After the next segmented data file ($S_1$) is transmitted by the service center 24, the process proceeds to decision block 278 where a decision is made whether the last data file has been transmitted by the calculated route (whether i=N). If the last data file has been transmitted, the process ends. If the last data file has not been transmitted, the process continues back at decision block 272 where the service center 24 waits until the next segmented data file is needed by the client device 22a–22N.

What has been described is a server-based navigation system and method of transmitting navigation data to a client device that reduces the complexity of the client device and is adaptable to devices having varying limitations. The above description of the present invention is intended to be exemplary only and is not intended to limit the scope of any patent issuing from this application. The present invention is intended to be limited only by the scope and spirit of the following claims.

What is claimed is:

1. A navigation system comprising:
   a client device that is capable of transmitting a starting point and a destination point from a user, the client device having a memory with a memory limit; and
   a service center that is capable of receiving the staffing point and the destination point and calculating a route consisting of a set of segmented data between the starting point and the destination point, the service center being further capable of generating and transmitting data associated with the calculated route to the client device, the service center being able to determine the memory limit in the client device;
   wherein, if the service center determines that the size of the set of data associated with the complete calculated route is greater than the memory limit of the memory in the client device, the service center will divide the set of data segments associated with the calculated route into subsets of segmented data files so that each subset of segmented data files will fit within the memory limit and transmits the subsets of segmented data files to the client device sequentially, each at a different time,
   wherein the memory limit of the memory in the client device is automatically determined by the service center based on a model of the client device.

2. The navigation system in claim 1, wherein the generated data associated with the calculated route includes information to provide at least voice, text, or graphic instructions to the user.

3. The navigation system in claim 1, wherein the client device has a positioning system and is further capable of transmitting a current location of the client device to the service center.

4. The navigation system in claim 1, wherein the service center has a positioning system to determine a current location of the client device.

5. The navigation system in claim 1, wherein the plurality of segmented data files each represents a separate geographic region along the calculated route.

6. The navigation system of claim 1, wherein the time that each segmented data file is transmitted is in response to a request made by the client device.

7. The navigation system in claim 1, wherein the service center has a means for determining a current location of the client device along the calculated route.

8. The navigation system in claim 7, wherein the time that each segmented data file is transmitted is determined by the service center based on the current location of the client device along the calculated route.

9. The navigation system in claim 1, wherein the memory limit of the memory in the client device is configured by the user.

10. A method in a service center of a navigation system, the method comprising the steps of:
    receiving a starting point and a destination point for a client device;
    calculating a route based on at least the staffing point and the destination point;
    generating data consisting of a set of segmented data associated with the calculated route;
    determining a size of the set of generated data associated with the calculated route;
    comparing the size of the set of generated data associated with the calculated route with a memory limit of the client device;
    dividing the set of generated data associated with the calculated route into a plurality of subsets of segmented data files if the size of the set of generated data associated with the calculated route is greater than the memory limit of the client device; and
    transmitting each set of segmented data file to the client device sequentially at a different time, wherein the time that each segmented data file is transmitted is in response to a request made by the client device.

11. The method in claim 10, wherein the step of generating data associated with the calculated route includes data that can provide at least voice, text, or graphic instructions to the user.

12. The method in claim 10, wherein each segmented data file represents a different geographic region along the calculated route.

13. The method in claim 10, wherein the method further includes the step of monitoring a current location of the client device along the calculated route before the step of transmitting each segmented data file to the client device.

14. The method in claim 10, wherein the method further includes the step of reducing the size of data associated with the calculated route over a geographic region that has a connection limitation for the client device.

15. The method in claim 10, wherein the step of transmitting each segmented data file includes transmitting at least one of the segmented data files before the client device enters a geographic region that has a connection limitation for the client device.

16. A method in a navigation system, the system having a service center and a client device, the method comprising the steps of:
    sending a starting point and a destination point to the service center;
    calculating in the service center a route for the client device based at least in part on the staffing point and the destination point;

generating in the service center data consisting of a set of segmented data associated with the calculated route;

determining in the service center whether a size of the generated data associated with the calculated route is greater than a memory limit of a memory in the client device;

if the size of the generated data associated with the calculated route is greater than the memory limit of the memory in the client device, dividing in the service center the generated data associated with the calculated route into a plurality of subsets of segmented data files; and transmitting from the service center to the client device each segmented data file subset sequentially at a different time, wherein the time that each segmented data file is transmitted is in response to a request made by the client device.

17. The method in claim 16, wherein the step of generating data associated with the calculated route includes data that can provide at least voice, text, or graphic instructions to a user of the client device.

18. The method in claim 16, wherein each segmented data file represents a different geographic region along the calculated route.

19. The method in claim 16, wherein the method further includes the step of monitoring a current location of the client device along the calculated route before the step of transmitting each segmented data file to the client device.

20. The method in claim 16, wherein the method further includes the step of reducing the size of data associated with the calculated route over a geographic region that has a connection limitation for the client device.

21. A service center in a navigation system, the service center comprising:

a communication unit for receiving a starting point and a destination point for a client device; and a server connected to the communication unit for calculating a route consisting of a set of segmented data between the starting point and the destination point, the server being further capable of generating and transmitting data associated with the calculated route to the client device, the server being able to determine the memory limit in the client device;

wherein, if the server determines that all the data associated with the calculated route cannot be transmitted to the client device at a single time, the server will divide the set of data segments associated with the calculated route into subsets of segmented data files so that each subset of segmented data files will fit within the memory limit and transmits the subsets of segmented data files to the client device sequentially, each at a different time, wherein the time that each segmented data file is transmitted is in response to a request made by the client device.

22. The service center in claim 21, wherein the generated data associated with the calculated route includes information to provide at least voice, text, or graphic instructions to the user.

23. The service center in claim 21, wherein the client device has a positioning system and is further capable of transmitting a current location of the client device to the server.

24. The service center in claim 21, wherein the service center further has a positioning system to determine a current location of the client device.

25. The service center in claim 21, wherein the plurality of segmented data files each represents a separate geographic region along the calculated route.

* * * * *

UNITED STATES PATENT AND TRADEMARK OFFICE
CERTIFICATE OF CORRECTION

| | |
|---|---|
| PATENT NO. | : 7,243,134 B2 |
| APPLICATION NO. | : 10/179076 |
| DATED | : July 10, 2007 |
| INVENTOR(S) | : Bruner et al. |

It is certified that error appears in the above-identified patent and that said Letters Patent is hereby corrected as shown below:

In Claim 1, column 17, line 36, change "staffing" to --starting--

In Claim 16, column 18, line 66, change "staffing" to --starting--

Signed and Sealed this

Twenty-ninth Day of July, 2008

JON W. DUDAS
*Director of the United States Patent and Trademark Office*